(12) United States Patent
McCann

(10) Patent No.: US 7,124,171 B1
(45) Date of Patent: Oct. 17, 2006

(54) IN A NETWORKED COMPUTING CLUSTER STORAGE SYSTEM AND PLURALITY OF SERVERS SHARING FILES, IN THE EVENT OF SERVER UNAVAILABILITY, TRANSFERRING A FLOATING IP NETWORK ADDRESS FROM FIRST SERVER TO SECOND SERVER TO ACCESS AREA OF DATA

(75) Inventor: Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 652 days.

(21) Appl. No.: 10/153,583

(22) Filed: May 23, 2002

(51) Int. Cl.
G06F 15/167 (2006.01)
G06F 17/30 (2006.01)

(52) U.S. Cl. ...................... 709/216; 707/200

(58) Field of Classification Search ............... 707/1–3, 707/8–10, 100–102, 200–205; 709/218–219, 709/225–230, 200–223, 231, 213–216; 710/5; 714/4; 713/150, 200
See application file for complete search history.

(56) References Cited

U.S. PATENT DOCUMENTS

| | | | | |
|---|---|---|---|---|
| 5,941,956 | A * | 8/1999 | Shirakihara et al. | 709/245 |
| 6,052,725 | A * | 4/2000 | McCann et al. | 709/223 |
| 6,330,605 | B1 * | 12/2001 | Christensen et al. | 709/226 |
| 6,356,863 | B1 * | 3/2002 | Sayle | 703/27 |
| 6,360,331 | B1 * | 3/2002 | Vert et al. | 714/4 |
| 6,393,485 | B1 * | 5/2002 | Chao et al. | 709/231 |
| 6,681,327 | B1 * | 1/2004 | Jardin | 713/153 |
| 6,711,559 | B1 * | 3/2004 | Kogota et al. | 707/1 |
| 6,725,047 | B1 * | 4/2004 | Farley et al. | 455/456.3 |
| 6,816,891 | B1 * | 11/2004 | Vahalia et al. | 709/214 |
| 7,020,669 | B1 * | 3/2006 | McCann et al. | 707/206 |
| 2002/0078174 | A1 * | 6/2002 | Sim et al. | 709/219 |
| 2002/0120763 | A1 * | 8/2002 | Miloushev et al. | 709/230 |
| 2002/0161848 | A1 * | 10/2002 | Willman et al. | 709/213 |
| 2003/0078965 | A1 * | 4/2003 | Cocotis et al. | 709/203 |
| 2003/0079030 | A1 * | 4/2003 | Cocotis et al. | 709/229 |
| 2003/0088650 | A1 * | 5/2003 | Fassold et al. | 709/220 |
| 2003/0097454 | A1 * | 5/2003 | Yamakawa et al. | 709/229 |

(Continued)

FOREIGN PATENT DOCUMENTS

EP 1363441 * 11/2003 ............... 29/12

(Continued)

OTHER PUBLICATIONS

Hector M Briceno, "design techniques for building fast servers", 1996, p. 2.*

(Continued)

*Primary Examiner*—Srirama Channavajjala
(74) *Attorney, Agent, or Firm*—BainwoodHuang

(57) ABSTRACT

A highly available shared file system is described for use in computing environments. A floating network address can be associated with any one of a plurality of servers. The floating network address is associated with a first server. An area of data on a storage device is made available by the first server to be accessed by the other servers. The other servers then refer to the floating network address to access the area of data through the first server. If the first server becomes unavailable, the floating network address is transferred from the first server to a second server. The area of data is then made available by the second server to be accessed by the other servers. The other servers continue to access the area of data through the second server by referring to the floating network address.

12 Claims, 8 Drawing Sheets

U.S. PATENT DOCUMENTS

| | | | | |
|---|---|---|---|---|
| 2003/0158836 | A1* | 8/2003 | Venkatesh et al. | 707/1 |
| 2003/0177107 | A1* | 9/2003 | Brown et al. | 707/1 |
| 2004/0107288 | A1* | 6/2004 | Menninger et al. | 709/231 |
| 2004/0236745 | A1* | 11/2004 | Keohane et al. | 707/9 |
| 2005/0210074 | A1* | 9/2005 | Nakatani et al. | 707/200 |
| 2005/0267920 | A1* | 12/2005 | Helliker et al. | 707/204 |

FOREIGN PATENT DOCUMENTS

| | | | | |
|---|---|---|---|---|
| EP | 1450538 | * | 8/2004 | 29/6 |
| GB | 2418326 | * | 3/2006 | 12/56 |
| WO | WO 00/22544 | * | 4/2000 | 15/167 |
| WO | WO2004/0038666 A1 | * | 5/2004 | |
| WO | WO2004/066588 | * | 8/2004 | 29/12 |
| WO | WO 2005/109223 | * | 11/2005 | 15/16 |

OTHER PUBLICATIONS

A.W.Apon et al. "sensitivity of cluster file system access to I/O server selection", proceedings of the 2$^{nd}$ IEEE/ACM international symposium on cluster computing and the grid, 2002, pp. 170-179.*

Pierre Lombard et al. "nfsp: a distributed NFS server for clusters of workstations", Apr. 2002, pp. 35-40.*

Koling Chang, et al. "NFS Dynamics over flow-controlled wide area networks", vol. 2, sixteenth anuual joint conference INFOCOM, '97, vol. 2, pp. 619-625.*

Amina Saify et al. enhancing high-performance computing clusters with parallel file systems, dell power solutiions, May 2005, 3 pages.*

Sanjay Ghemawat et al. "the google file system", SOSP '03, Oct. 2003, 15 pages.*

Harjinder S Sandhu et al. "cluster-based file replication in large-scale distributed systems", performance evaluation review, vol. 20, No. 1 Jun. 1992, pp. 91-102.*

B.Cliford Neuman, "the virtual system model for large distrubuted operating systems", technical report 89-01-07, Apr. 1989, pp. 1-17.*

Michael K Gschwind, "ftp2nfs-integrating FTP into the file name pace", 1994, pp. 1-7Olexity et al. "take command starting share files with NFS", Linux Journal, vol. 2002, issue 93, 2002 p. 1-9.*

Rafael B Avila et al. "performance evaluation of a prototype distributed NFS server", proceedings of the 16th symposium on computer architecture and high performance computing, Oct. 2004, pp. 100-105.*

Athicha Muthitacharoen et al. "a low bandwidth network file system", no date, 14 pages.*

Peter J Braam, "file systems for clusters from a protocol perspective", no date, 5 pages.*

Alex Noordergraaf et al. securing the Sun Fire™ 12K and 15K Domains updated for SMS 1.2, Sun BluePrints™ OnLine-Jul. 2002 33 pages.*

Putchong Uthayopas, Parallel Research Group, "Cluster software Tools: Beauty is in Simplicity", Department of Computer Engineering, Kasetsart University, Bankok Thailand, IEEE Cluster computing 2001, Newport Beach, CA, pp. 1-39.*

Jiang Lan et al. "consistency maintenance in peer-to-peer file sharing networks", proceedings of the third IEEE workshop on internet applications, 2003, pp. 1-5.*

Anderson,D et al. "failure-atomic file access in an interposed networkstorage system", IEEE 2000, pp. 157-164.*

Darrell C,A et al. "interposed request routing for scalable network storage", ACM transactions on computer systems, TOCS, vol. 20, issue 1, pp. 25-48.*

Author unknown, "Convolo Cluster Software Version 1.2", mission critical linux, Dec. 2000, Lowell MA USA 7 pages only.

Soltis et. al., "The Global File System", Proceedings of the Fifth NASA Goddard Space Flight Center Conference on Mass Storage Systems and Technologies, Sep. 17-19, 1996, College Park MD, USA 23 pages only.

Author unknown, "Celerra File Server Architecture for High Availability", EMC Corporation, 1999, Hopkinton MA USA 11 pages only.

* cited by examiner

IN A NETWORKED COMPUTING CLUSTER STORAGE SYSTEM AND PLURALITY OF SERVERS SHARING FILES, IN THE EVENT OF SERVER UNAVAILABILITY, TRANSFERRING A FLOATING IP NETWORK ADDRESS FROM FIRST SERVER TO SECOND SERVER TO ACCESS AREA OF DATA

FIELD OF THE INVENTION

The present invention relates generally to shared file systems for use in computing environments, and more particularly to techniques for providing a highly available shared file system.

BACKGROUND OF THE INVENTION

In today's computing environments, many computers can have access to many areas of storage on one or several storage subsystems. The areas of storage on disks, CD-ROMs and the like are usually arranged into file systems consisting of organized directories and files for ease of access by the user of a given computer. In many applications, it is useful to be able to share such file systems between multiple computers.

Software is available to enable such file sharing for different types of computing systems. For example, the Network File System ("NFS"), developed by Sun Microsystems Inc., allows sharing of file systems in such computing environments. NFS allows a server, known as the NFS server, to "export" a file system such that it is available for use by other computers, known as NFS clients. The NFS clients can then "mount" the file system, allowing them to access the file system through the NFS server that exported the file system.

Many computing environments implement critical software, such as database applications, that must be highly available. That is, little down time can be tolerated for these applications. Such critical software often requires a file sharing system. NFS, though simple to implement, presents a single point of failure for a given file system because all the NFS clients access the file system through the NFS server. NFS is therefore not an ideal file sharing system in its present form for use in a highly available environment.

Highly available file systems, known as "clustered file systems" ("CFS") have been developed in order to provide a more robust file system sharing solution. A typical CFS allows storage devices such as disks, CD-ROMs and the like to be attached to all nodes in the cluster and to be accessed directly by every node. The storage devices appear to be controlled and managed by a single entity, which continues to operate as nodes in the cluster fail and recover. Since all nodes have direct access to all storage, there is no single point of failure. Though a CFS provides a highly available shared file system, a CFS is very complicated, expensive, and difficult to implement.

There is a need for a shared file system that is highly available but relatively simple to implement and that avoids the other inadequacies and disadvantages associated with implementing a full scale CFS.

SUMMARY OF THE INVENTION

In accordance with the invention, there is provided a method for sharing files amongst a plurality of servers. A floating network address is provided that can be associated with any one of the servers. The floating network address is associated with a first server of the plurality of servers. An area of data on a storage device is made available by the first server to be accessed by the other servers. The other servers then refer to the floating network address to access the area of data through the first server. In accordance with a preferred embodiment, all servers, including the first server, refer to the floating network address to access the area of data through the first server.

Further in accordance with the invention, the floating network address is transferred from the first server to a second server. The area of data is then made available by the second server to be accessed by the other servers. All the servers continue to access the area of data by referring to the floating network address.

According to an embodiment of the invention, the first and second servers are NFS servers and the other servers are NFS clients. The first server makes the area of data accessible to the other servers by issuing an NFS export command to export the area of data. The other servers, and preferably all the servers, issue an NFS mount command to mount the area of data at the floating network address. When the floating network address is transferred from the first server to the second server, the second server then issues an NFS export command to export the area of data. All the servers continue to refer to the floating network address to access the area of data. The failover of the NFS server is thus transparent to the NFS clients.

Similar apparatus and program products are provided in accordance with the invention. In the preferred embodiments, all servers access a shared file system in the same manner, through an NFS mount at the floating network address. At any given time, one of the servers exports a given file system at the floating network address. Thus, all servers always have access to the file system, no matter which server exported it. The invention is advantageous in that a highly available shared file system is provided that is relatively uncomplicated and inexpensive to implement.

DETAILED DESCRIPTION OF EXEMPLARY EMBODIMENTS

Figure 1:
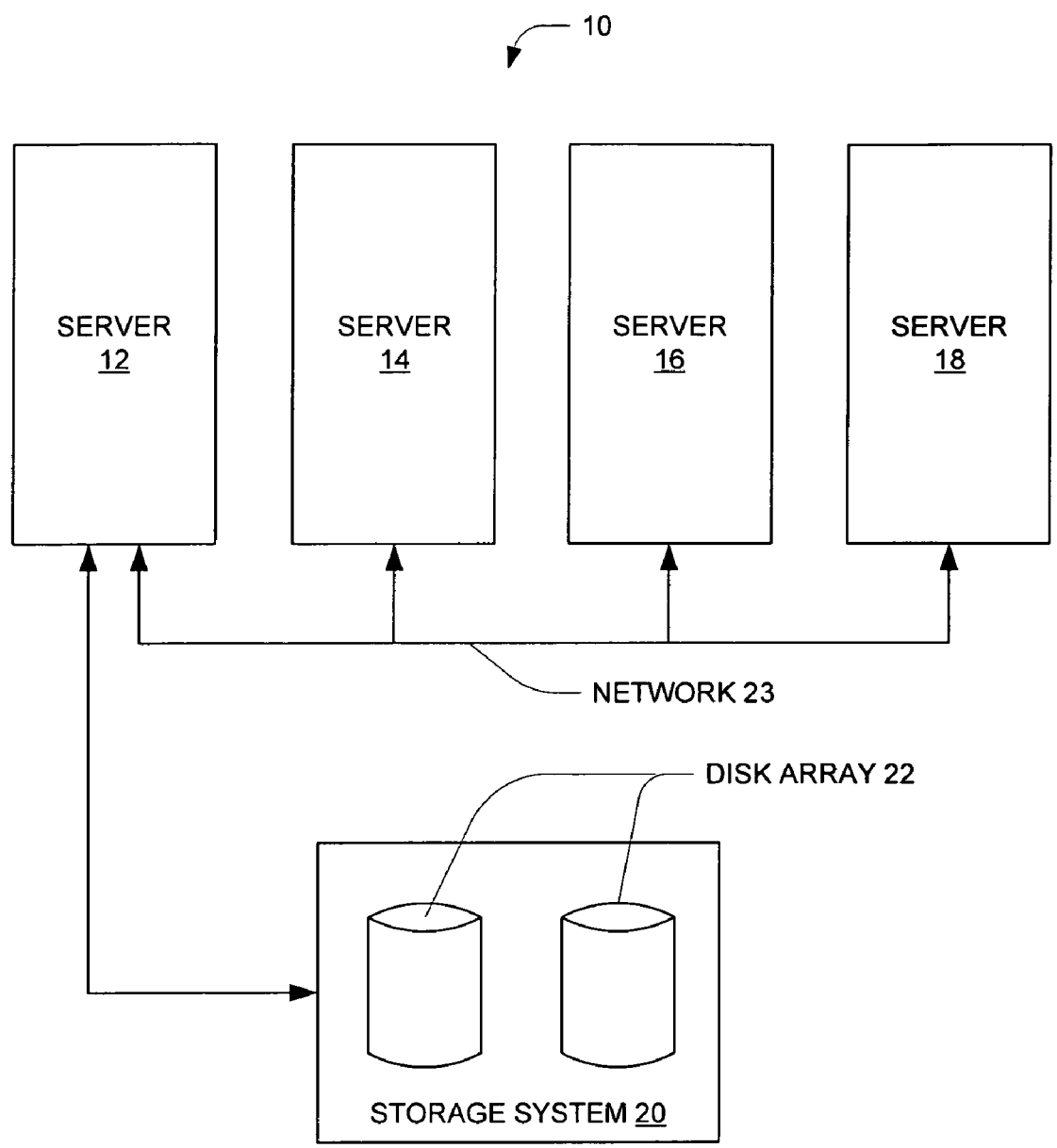
FIG. 1 is a schematic depiction of a cluster of servers, one of the servers being coupled to a storage system.

In FIG. 1 there is shown a networked computing cluster 10 including servers 12, 14, 16, and 18, and a storage system 20. The storage system 20 includes a disk array 22. The servers may be for example general computing servers, workstations, or dedicated file servers through which clients access file systems stored on the storage system 20. The servers are in communication with each other via a network 23. The server 12 is in communication with the storage system 20. The server 12 is capable of building file systems on the storage system 20 and sharing those file systems with the other servers.

The file sharing utility preferably employed by the servers is the Network File Sharing system, or NFS. As is known in the art, NFS allows a server, for example server 12, to attach an area on the disk array 22, and issue an NFS "export" command in order to cause the file system to be shared by the other servers, either globally or selectively. The other servers, if selected as part of the export, can issue an NFS "mount" command to gain access to the shared file system. After mounting the file system, a given server 14, 16, or 18 can now access the file system via the server 12. The server 12 that issued the export command is referred to as an NFS server, while the other servers 14, 16, and 18 that mounted the shared file system are referred to as NFS clients. The servers 14, 16, and 18 may also be in communication with the storage system 20 or with another storage system or device (not shown) and can thus also operate as an NFS server. The server 12 is also capable of operating as an NFS client, for accessing files exported by another server. Furthermore, the NFS server 12 can export the shared file system to itself. The server 12 then, operating as an NFS client, accesses the filesystem in a "loopback" fashion as if the file system was remote, even though it is actually local. Generally, a given server operates as an NFS server when exporting file systems located on storage systems to which it is attached, and operates as an NFS client when mounting and accessing filesystems located on storage systems to which the other servers are attached, or when mounting and accessing filesystems that it has exported to itself.

NFS is a connectionless, stateless protocol, employing UDP datagrams for protocol information transfer. As such, the protocol will not fail in the event that the NFS server becomes unavailable. Rather, an NFS client will simply wait for a response to its outstanding request—or continue to re-issue it—until the NFS server recovers. However, some applications that utilize the NFS client are not tolerant of extended wait times and may fail ungracefully in the event that an NFS server becomes unavailable. It is therefore advantageous to implement a highly available NFS system in accordance with the principles of the invention.

In accordance with the invention, the servers 12, 14, 16, and 18 are members of a cluster. Each server implements certain functionality common to available cluster package software. Cluster software is available to enable clustered services to "fail over" between servers. If for example server 12 is hosting a particular service, and server 12 becomes unavailable, for example due to failure or in response to a command to relinquish the service, one of the other servers such as server 14 will assume the hosting of the service in a manner transparent to the other servers, thus preventing interruption of the service. Known cluster software such as the Linux Global File System (GFS), available from Sistina Inc., or the Linux Virtual Server (LVS) software, available from Red Hat Inc., provide resources for server failure detection and for the transfer of services between servers. In particular, such cluster software provides a resource for associating a service with a "floating IP address", a unique IP address that moves between servers as servers fail or otherwise relinquish a service. Server 12 may for instance host a clustered service associated with the floating IP address. If server 12 fails, or relinquishes the service for other reasons, one of the other servers such as server 14 assumes ownership of the floating IP address. The clustered service fails over with the floating IP address to be hosted by the server 14. The failover is transparent to the other servers in the cluster, all of which continue to utilize the service associated with the floating IP address. Most available cluster software packages allow software scripts to be written to associate a given service with the failure detection and floating IP address resources to enable transparent failover of the service.

Figure 2:
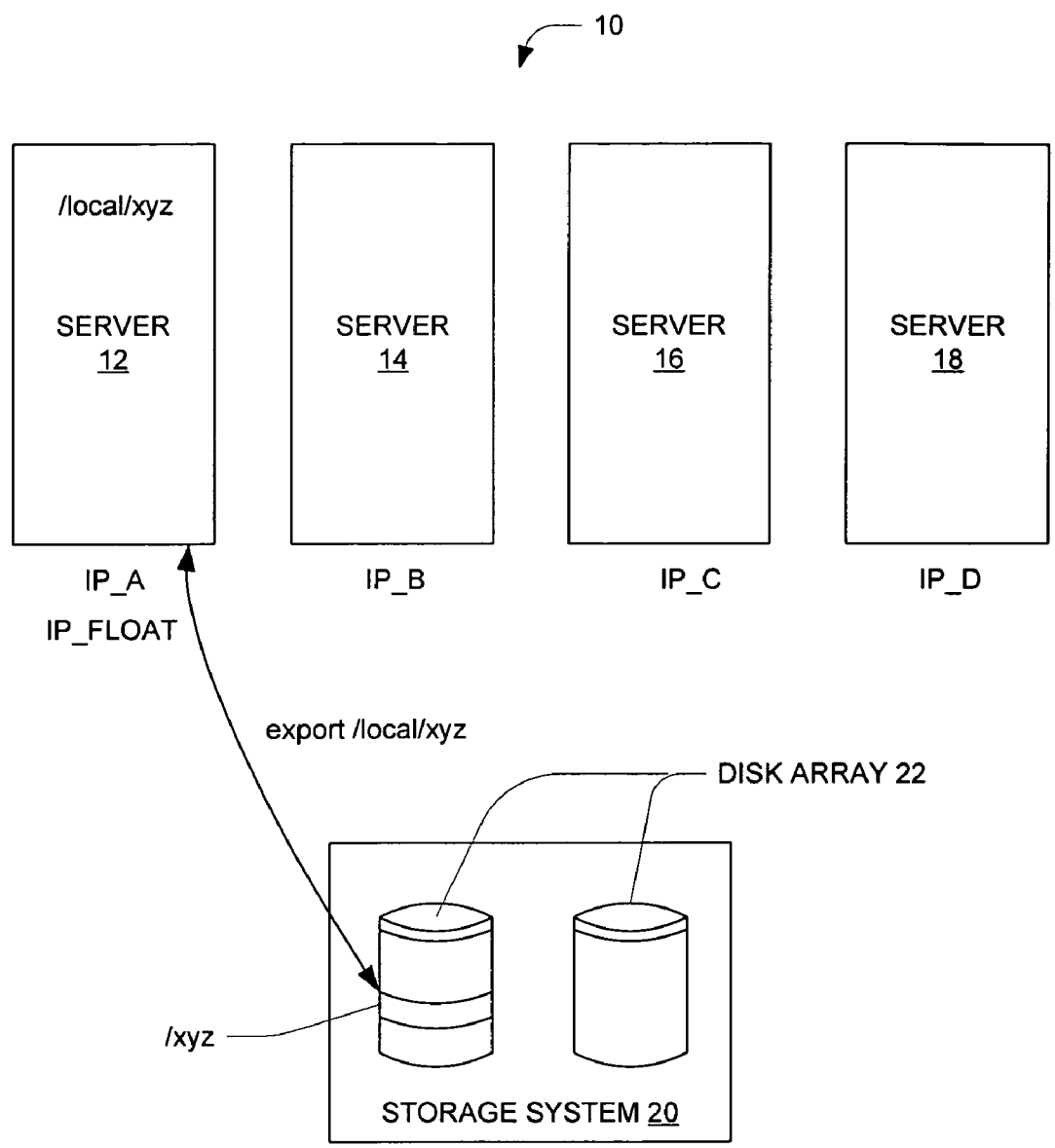
FIG. 2 is a schematic depiction of the cluster of servers, wherein the server coupled to the storage system is associated with a floating network address and exports a file system for use by the other servers.

Referring now to FIG. 2, In accordance with the invention, the servers 12, 14, 16, and 18 each have a unique IP address, herein shown as IP_A, IP_B, IP_C, and IP_D. Further shown is a "floating IP address" shown as IP_Float. The floating IP address IP_Float moves between the servers 12, 14, 16, and 18 as service unavailabilities occur. The floating IP address IP_Float is herein shown to be currently associated with the server 12. In the event that the server 12 becomes unavailable, the floating IP address IP_Float is assumed by one of the other servers, for example server 14, and services associated with the floating IP address IP_Float migrate with the floating network address to be hosted by the server 14. In accordance with the principles of the invention, an NFS server is associated with the floating network address, and in the event that the NFS server becomes unavailable, for example due to failure or in response to a command to relinquish the NFS server function, another server will assume ownership of the floating network address and will re-export the file systems owned by the NFS server such that the file systems continue to be available to all the servers at the same floating IP address.

Figure 3:
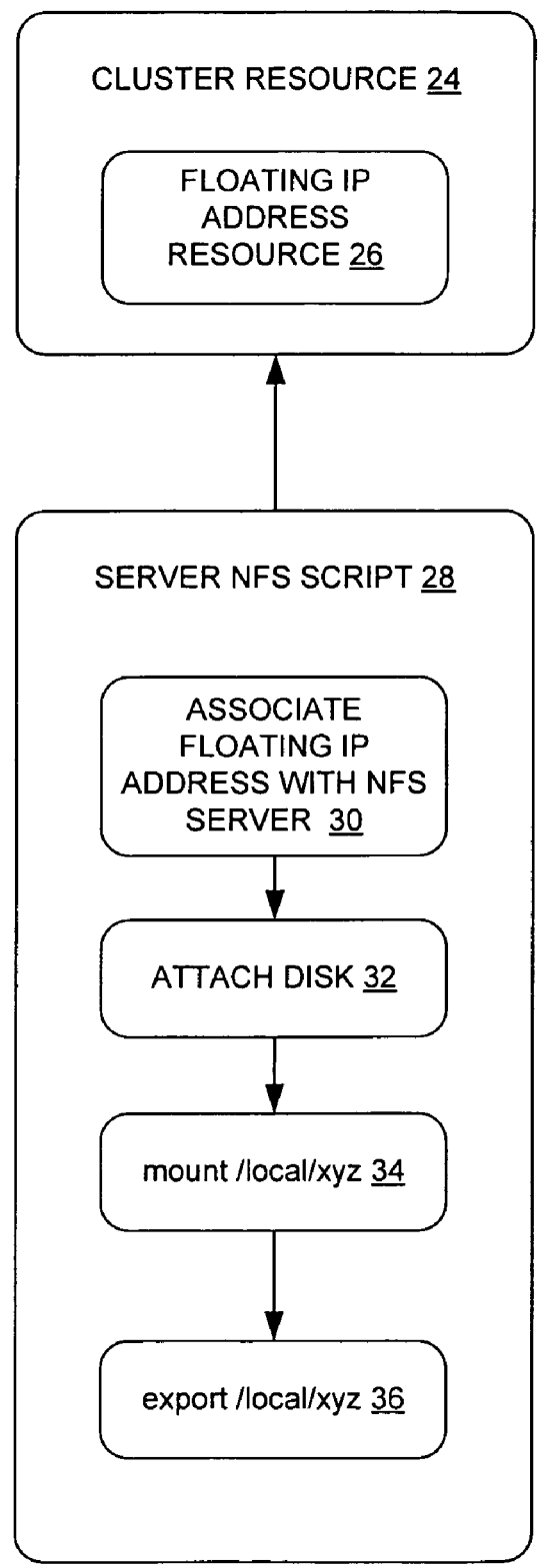
FIG. 3 is a schematic depiction of software functions used in accordance with the invention.

This can be done, for example, by providing a software NFS script for the cluster software package employed. Referring to FIG. 3, there is shown a cluster resource 24 that includes a floating IP address resource 26. An NFS script 28 is associated with the cluster resource 24 and includes a function 30 that associates the NFS service with the floating IP address. The script also provides a set of instructions to be executed during failover—that is, a set of instructions to be executed by a server that assumes the NFS server duties from a failed NFS server. As herein shown the set of instructions to be executed include an attach disk function 32, a local mount function 34, and an export function 36. Any one of the servers 12, 14, 16, and 18 can execute the NFS script when the cluster is brought on line, or when the NFS service is started, in order to associate the floating address with the NFS server. In the current example, the script is run by the server 12.

Referring back to FIG. 2, the server 12 is shown to have attached a physical NFS file system located on the disk array 22, denoted as "/xyz". In order that the file system "/xyz" can be shared amongst the other servers, the server 12 exports it for use by itself and the other servers. The resources provided by the cluster software, for example by way of execution of the NFS script previously described, are employed to associate the export functionality of the NFS server 12 with the floating IP address IP_Float. The NFS server thus exports the file system /xyz at the address IP_Float. Meanwhile, all servers, as NFS clients, employ a standing command to mount the file system /xyz at address IP_Float. The NFS clients thus access a file system owned by a machine with address IP_Float, rather than a file system owned by the server 12's IP address IP_A. The server 12 also mounts the file system /xyz at address IP_Float. Accesses to the file system /xyz by the server 12 therefore occur via the remote IP_Float address and are looped back to the local address. Thus, all NFS clients access the file system in the same manner, and all accesses to the file system by any application on any server are consistently serviced. When the NFS server fails or relinquishes service, the floating IP address and NFS server export functionality will be assumed by another server in the cluster. The failover will be transparent to all NFS clients, as they continue to access the mounted filesystem at the address IP_Float.

FIG. 2 represents an example of employment of the invention in a UNIX or Linux environment. One skilled in the art will recognize that various operating systems utilize different syntaxes for the NFS export and mount commands. For example, Linux operating systems provide an "export" command, while the equivalent function in a Sun Solaris system is provided by a "share" command. The syntax herein shown is generic and similar to Linux syntax, but one skilled in the art will understand how to implement the generic commands herein for a given operating system.

When the server 12 needs to set up the file system for sharing, it first attaches the areas on the disk array 22 where the file system is located, and locally mounts the file system at a private location shown as "/local/xyz". The server 10 then exports the file system for use by all servers. The "export/local/xyz" function depicted in FIG. 2 can be implemented for example by placing an entry in the /etc/exports file on the server 12:

/local/xyz IP_A(options) IP_B(options) IP_C(options) IP_D(options)

The file system has thus been exported to all the servers 12, 14, 16, and 18, with options controlling for example the type of access each server will have to the file system "/local/xyz", for example read-only, read-write, etc.

Figure 4:
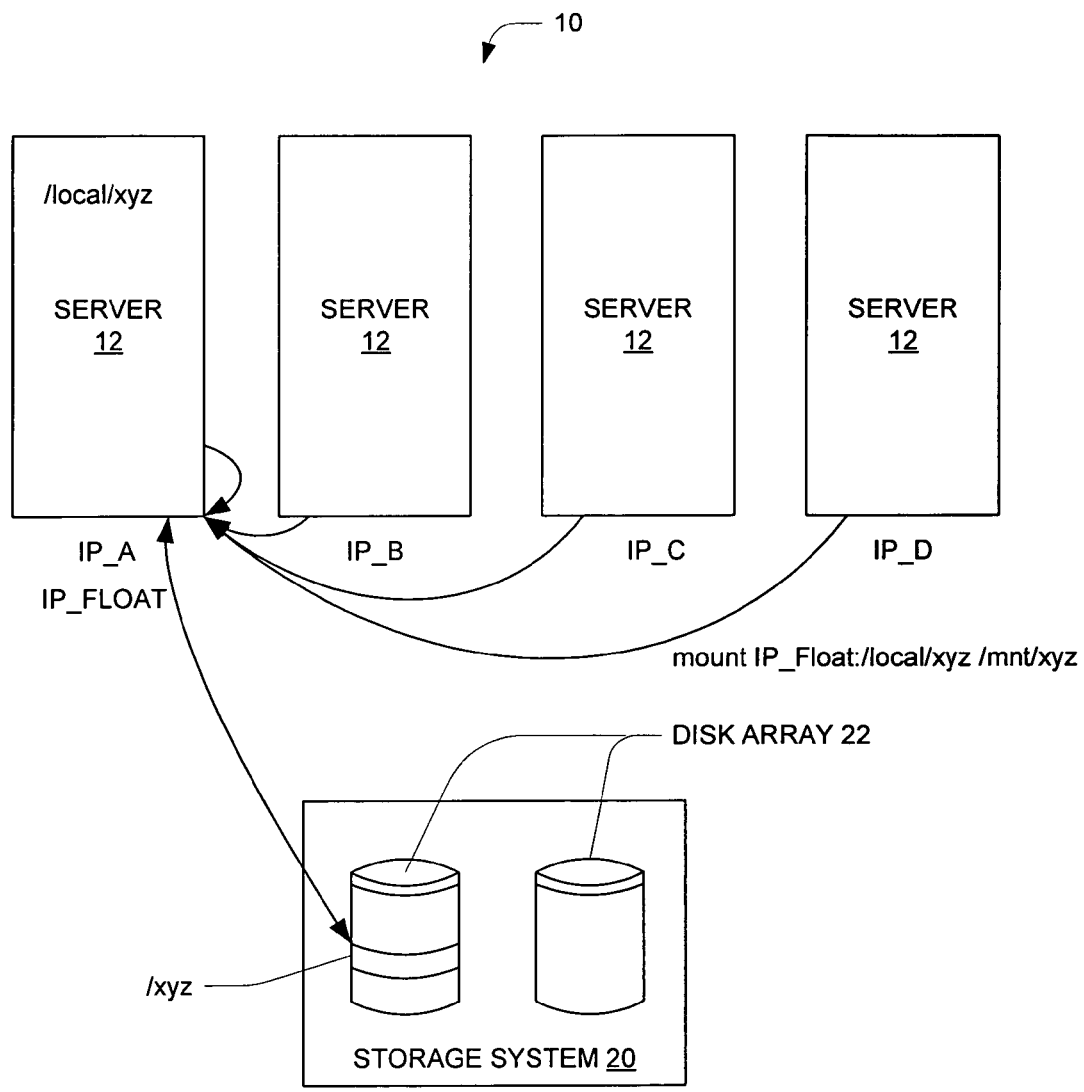
FIG. 4 is a schematic depiction of servers mounting an area on the storage system in accordance with the principles of the invention.

Meanwhile, the file system is mounted by all servers. Referring to FIG. 4, because of the floating IP address resource employed, the NFS clients recognize a file system "/local/xyz" owned by a server with address IP_Float. So, the servers 12, 14, 16, and 18 would share the file system "/local/xyz" by issuing a mount command:

mount IP_Float:/local/xyz /mnt/xyz

Figure 5:
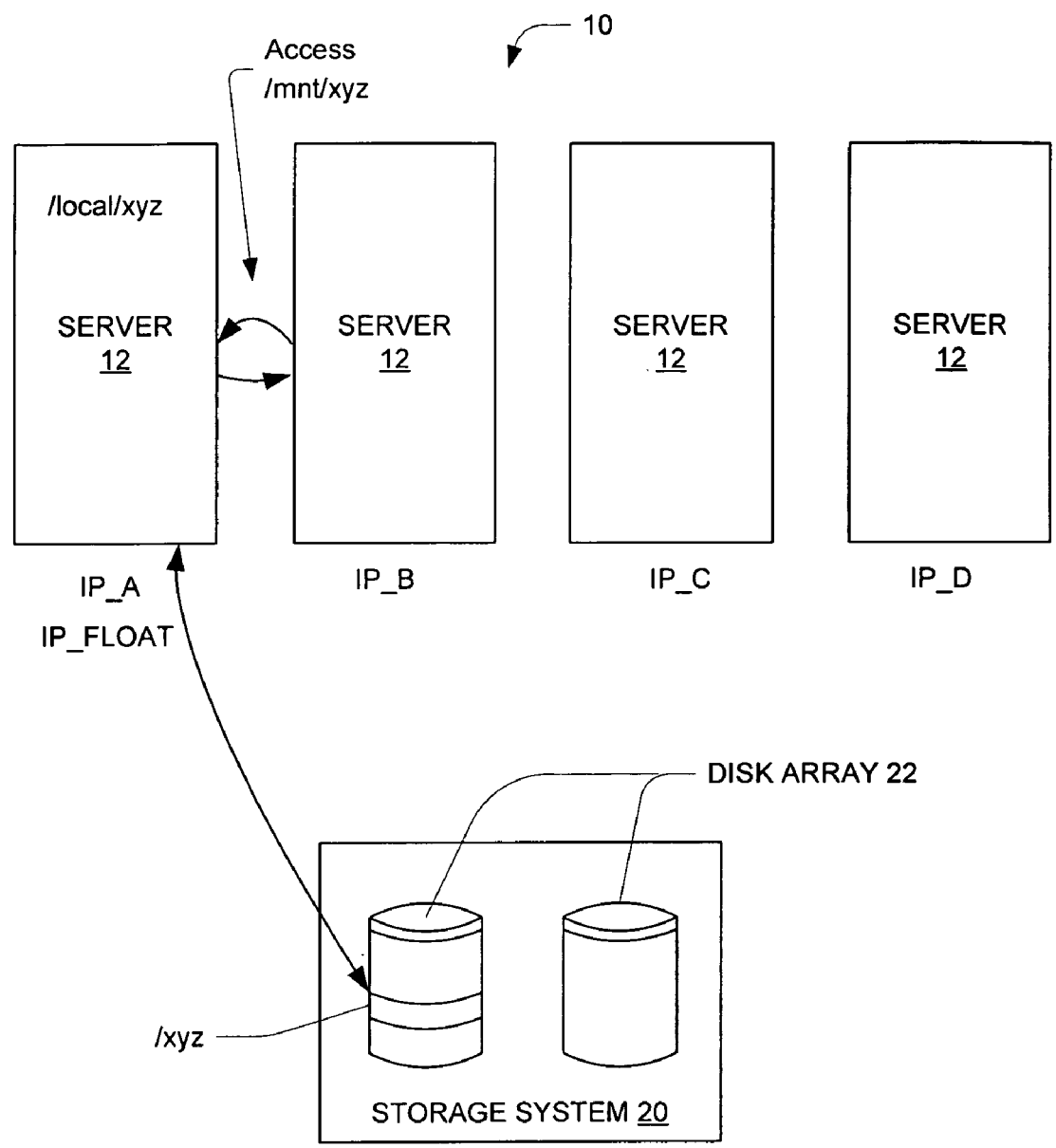
FIG. 5 is a schematic depiction of how NFS clients access the area on the storage system via the NFS server at the floating network address.

This command mounts the filesystem xyz owned by the server with address IP_Float to a directory /mnt/xyz which is now available to the servers 12, 14, 16, and 18. (This mount functionality is depicted in FIG. 4 by arrows from servers 18, 16, 14, and 12 to server 12.) Alternatively, the mount command can reside in each server's /etc/fstab file such that the file system is mounted at boot time. As shown in FIG. 5, the servers 12, 14, 16, and 18 can now access their directories /mnt/xyz through the server 12. FIG. 5 depicts an access by the server 14 to its directory /mnt/xyz through the server 12. Servers 16 and 18 access their /mnt/xyz directories in the same manner.

Note that, as previously generally described, the server 12 also exported the file system "/local/xyz" to itself. The server 12 executes the mount command as well. Thus, the server 12 accesses the file system "/xyz" via the floating address IP_Float rather than its own local address IP_A. As such, the accesses by the server 12 to the file system "/xyz" are looped back via the floating IP address IP_Float to its local mount. All servers 12, 14, 16, and 18 thus access the file system "/xyz" at the same remote address. Thus, a clustered application running on several or all of the servers accesses the file system "/xyz" via NFS in a consistent manner, allowing functions such as file locking to be properly serviced.

Figure 6:
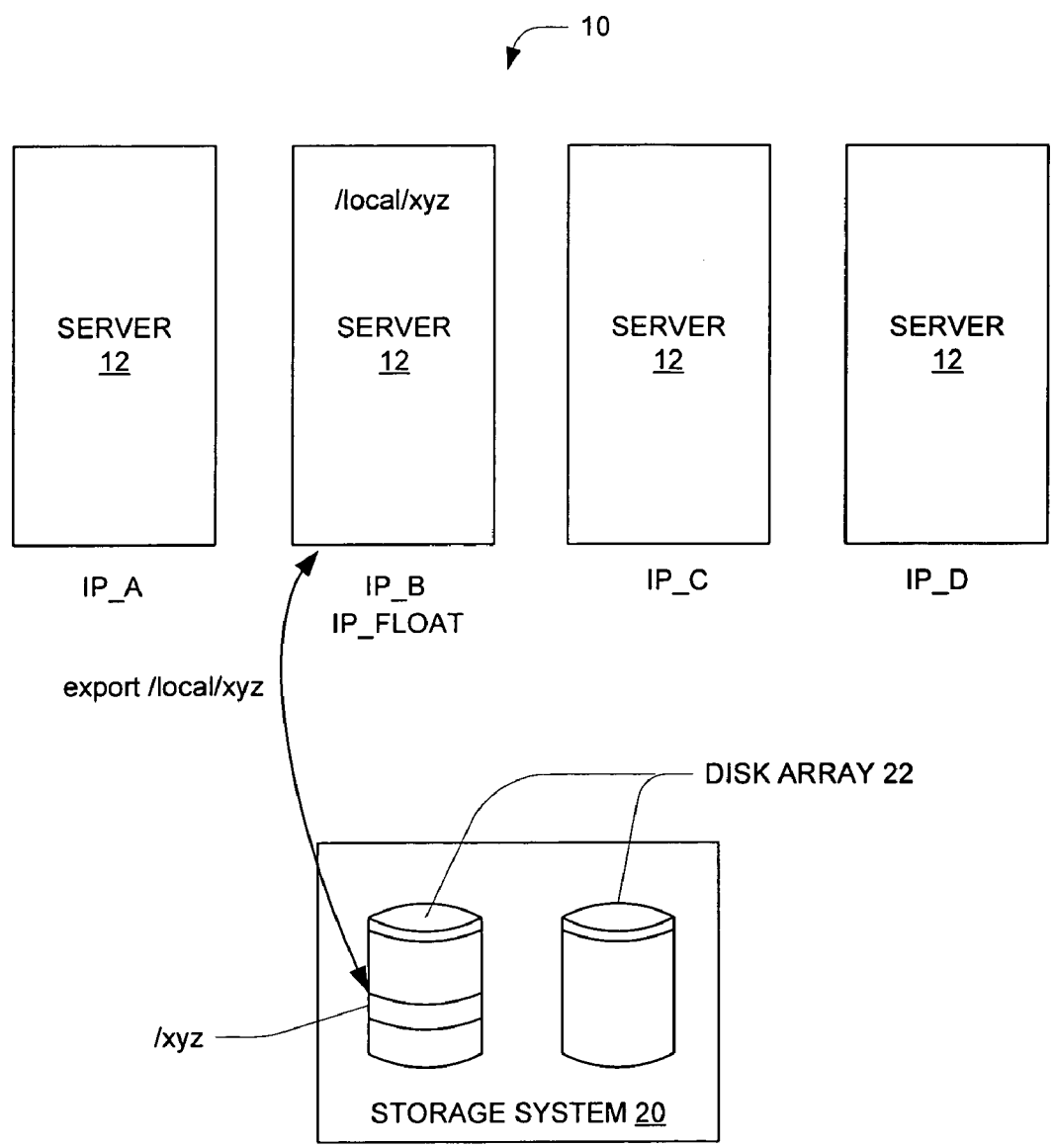
FIG. 6 is a schematic depiction of a failover of NFS server functionality from one server to another server.

Referring now to FIG. 6, in the event that server 12 fails or is otherwise commanded to relinquish its NFS server services, the floating IP address failover resource 26 will execute and cause the floating IP address IP_Float to be assumed by another functional server, for example server 14. The NFS server script 28 associated with the floating IP address resource is executed on the server 14. The failover portion of the NFS server script causes the server 14 to attach the areas in the disk array 22 associated with the file system "/xyz" (FIG. 3 step 32), giving the server 14 direct access to the areas in the disk array 22. The script then causes the server 14 to mount the file system at a location local to the server 14, i.e. at "/local/xyz" (FIG. 3 step 34). The resource then causes the server 14 to execute an NFS export command for the file system "/local/xyz" (FIG. 3 step 36).

Figure 7:
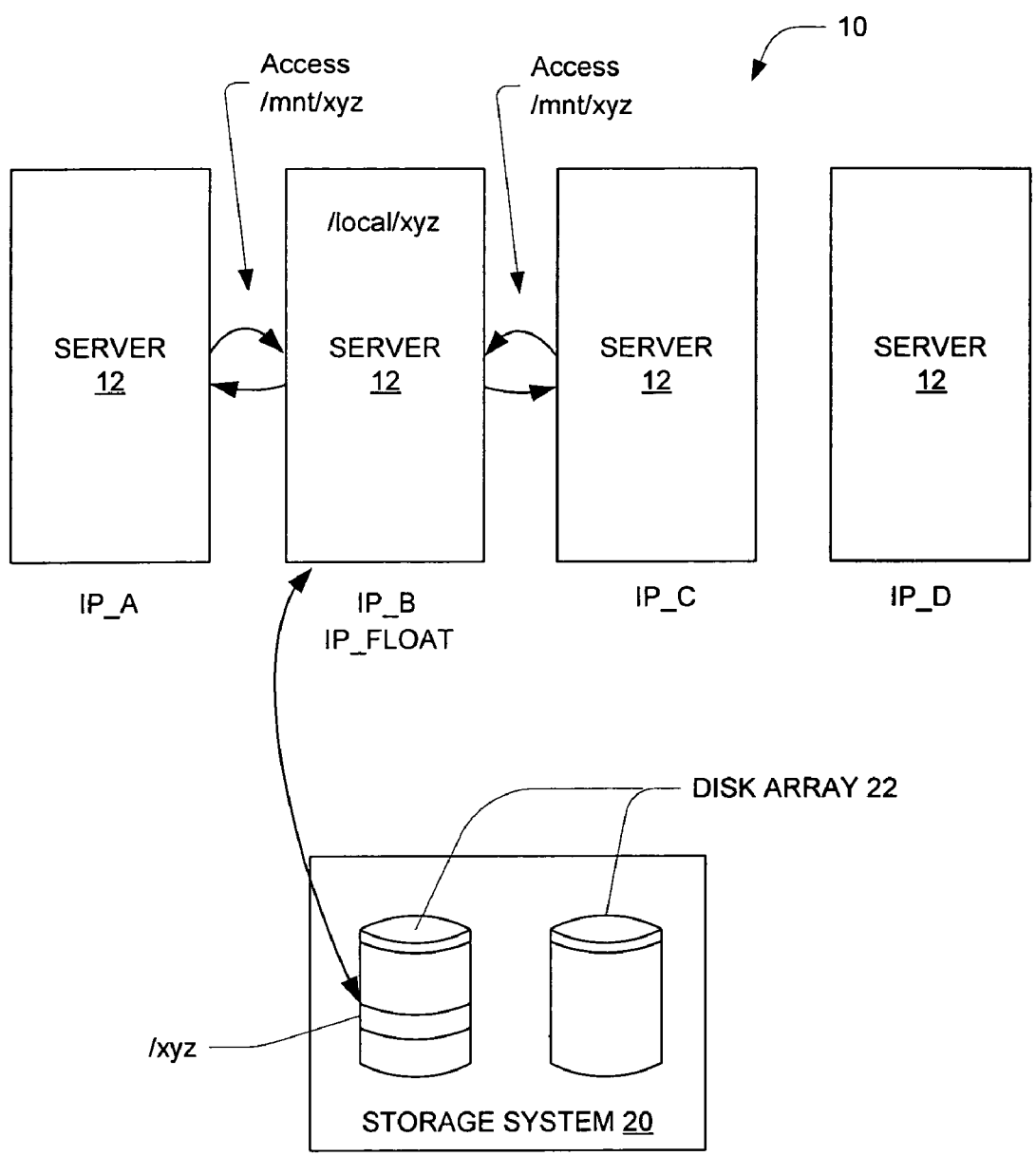
FIG. 7 is a schematic depiction of how NFS clients continue to access the area on the storage system via the floating network address after the failover.

As shown in FIG. 7, the failover of the server 12 is transparent to all the servers 12, 14, 16 and 18, because the file system /mnt/xyz continues to be available at address IP_Float. Applications using NFS clients that access the file system "/mnt/xyz" through or from these servers do not recognize that any failure has occurred, and suffer nothing more than a temporary minor performance degradation during the failover. The filesystem "/mnt/xyz" is always available to the servers via whichever server is associated with the network address "IP_Float". In addition, if the server 12 comes back on-line, it can continue to access the resource "/mnt/xyz" that was mounted at IP_Float as it did before, even though the file system "/mnt/xyz" is no longer actually local to the server 12 and is rather being accessed through the server 14. All applications running on or through the servers 12, 14, 16, and 18 now access the file system "/mnt/xyz" through the server 14.

Figure 8:
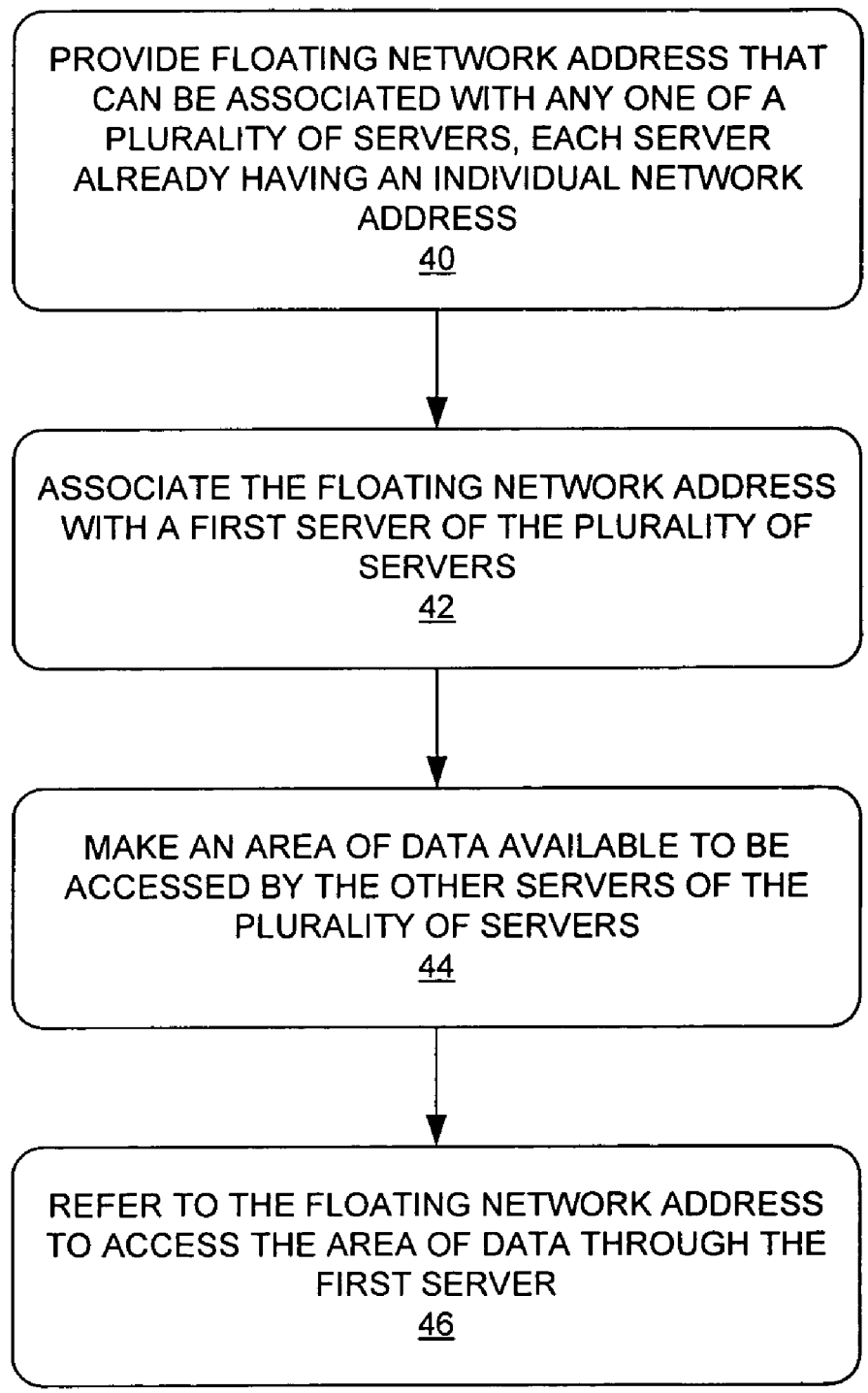
FIG. 8 is a flow diagram illustrating a method for sharing files in accordance with the present invention.

FIG. 8 shows a flowchart for a method for sharing files. In step 40, a floating network address is provided that can be associated with any one of a plurality of servers, each server already having an individual network address. In the embodiment of FIGS. 1–7, this corresponds to the IP_Float address and the servers 12–18. In step 42, the floating network address is associated with a first server of the plurality of servers. In step 44, an area of data is made available by the first server to be accessed by the other servers of the plurality of servers. This functionality corresponds to the description of FIGS. 1–3 above. In step 46, the other servers of the plurality of servers refer to the floating network address to access the area of data through the first server.

Note that, in accordance with the principles of the invention, it is not necessary to provide a dedicated backup server in order to provide a highly available NFS file system. Also, in accordance with the principles of the invention, NFS clients on any of the servers 12, 14, 16, and 18 within the cluster 10 can mount the file system IP_Float:/local/xyz and will be able to continually access it in the event of a failure. Furthermore, multiple file systems may be owned by different servers at the same time. A floating IP address can be associated with each server that owns one or more file systems. All the file systems on a given server can then fail over to another server when the server owning the file systems fails.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the preferred embodiment of the invention employs NFS as the shared file system, the principles of the invention could be employed with other file systems, for example Samba, which is a Microsoft Windows file system, or the Andrew file system, which is used by IBM computers, or Coda, another known shared file system. Accordingly, the claims set forth below should be construed in view of the full breadth and spirit of the present invention as disclosed herein.

I claim:

1. In a networked computing cluster including a storage system and a plurality of servers in communication with the storage system, a method for sharing files in an area of data of the storage system, comprising:
    providing a floating Internet Protocol (IP) network address that can be associated with any one of the plurality of servers, each server already having a respective individual network address different from the floating IP network address;
    associating the floating IP network address with a first server of the plurality of servers;
    making the area of data available by the first server to be accessed by the other servers of the plurality of servers upon reference by the other servers of the plurality of servers to the floating IP network address;
    in the event that the first server becomes unavailable, (1) transferring the floating IP network address from the first server to a second server of the plurality of servers so that the first server is no longer associated with the floating IP network address and the second server is associated with the floating IP network address, and (2) making the area of data available by the second server to be accessed by the other servers of the plurality of servers upon reference by the other servers to the floating IP network address,
    wherein the area of data includes a file system stored on a storage area of the storage system, and wherein:
        (i) making the area of data available by the first server comprises executing, by the first server, a file system sharing routine including:
            (a) attaching to the storage area of the storage system to obtain direct access to the storage area;
            (b) locally mounting the file system stored on the storage area; and
            (c) issuing an export command to cause the file system to be shared among the plurality of servers, the export command including the floating IP network address as the network address to be referred to by the servers when accessing the file system; and
        (ii) transferring the floating IP network address comprises executing, by the second server, a failover routine including the above steps (a)–(c) of the file system sharing routine.

2. The method of claim 1 wherein the first server also refers to the floating IP network address to access the area of data.

3. The method of claim 1 wherein the first server is an NFS server and the other servers of the plurality of servers are NFS clients.

4. The method of claim 3 wherein the step of making the area of data available by the first server to be accessed by the other servers of the plurality of servers comprises issuing by the first server an NFS export command to export the area of data.

5. The method of claim 4 wherein the step of referring by the other servers of the plurality of servers to the floating IP network address to access the area of data through the first server comprises issuing by the other servers an NFS mount command to mount the area of data at the floating IP network address.

6. The method of claim 5 wherein the step of making the area of data available by the second server to be accessed by the other servers of the plurality of servers comprises issuing by the second server an NFS export command to export the area of data.

7. In a networked computing cluster including a storage system, apparatus for sharing files in an area of data of the storage system, comprising:
    a plurality of servers in communication with the storage system, each server having an individual network address;
    a floating Internet Protocol (IP) network address that can be associated with any one of the servers, the floating IP network address being different from each of the individual network addresses of the plurality of servers, wherein the floating IP network address is associated with a first server of the plurality of servers;
    the first server being capable of making the area of data on a storage device accessible to the other servers of the plurality of servers upon reference by the other servers of the plurality of servers to the floating IP network address;
    a mechanism operative in the event that the first server becomes unavailable to (1) transfer the floating IP network address from the first server to a second server of the plurality of servers so that the first server is no longer associated with the floating IP network address and the second server is associated with the floating IP network address, and (2) make the area of data available by the second server to be accessed by the other servers of the plurality of servers upon reference by the other servers to the floating IP network address,
    wherein the area of data includes a file system stored on a storage area of the storage system, and wherein:
        (i) the first server is operative when making the area of data available to execute a file system sharing routine including:
            (a) attaching to the storage area of the storage system to obtain direct access to the storage area;
            (b) locally mounting the file system stored on the storage area; and
            (c) issuing an export command to cause the file system to be shared among the plurality of servers, the export command including the floating IP network address as the network address to be referred to by the servers when accessing the file system; and
        (ii) the mechanism, when transferring the floating IP network address, includes executing, by the second server, a failover routine including the above steps (a)–(c) of the file system sharing routine.

8. The apparatus of claim 7 whereby the first server is also capable of referring to the floating IP network address to access the area of data.

9. The apparatus of claim 7 wherein the first server is an NFS server and the other servers of the plurality of servers are NFS clients.

10. The apparatus of claim 9 wherein the first server is capable of making an area of data on the storage device accessible to the other servers by issuing an NFS export command to export the area of data.

11. The apparatus of claim 10 whereby the other servers of the plurality of servers are capable of referring to the floating IP network address to access the area of data through the first server by issuing an NFS mount command at the floating IP network address.

12. The apparatus of claim 11 wherein the second server is capable of making the area of data on the storage device accessible to the other servers by issuing an NFS export command to export the area of data.

* * * * *